Aug. 10, 1965  R. R. RUHNKE  3,199,822
SUPPORT CLIP

Filed June 21, 1962  2 Sheets-Sheet 1

Inventor,
Richard R. Ruhnke,
By: Schneider, Dressler, Goldsmith & Clement, Attys.

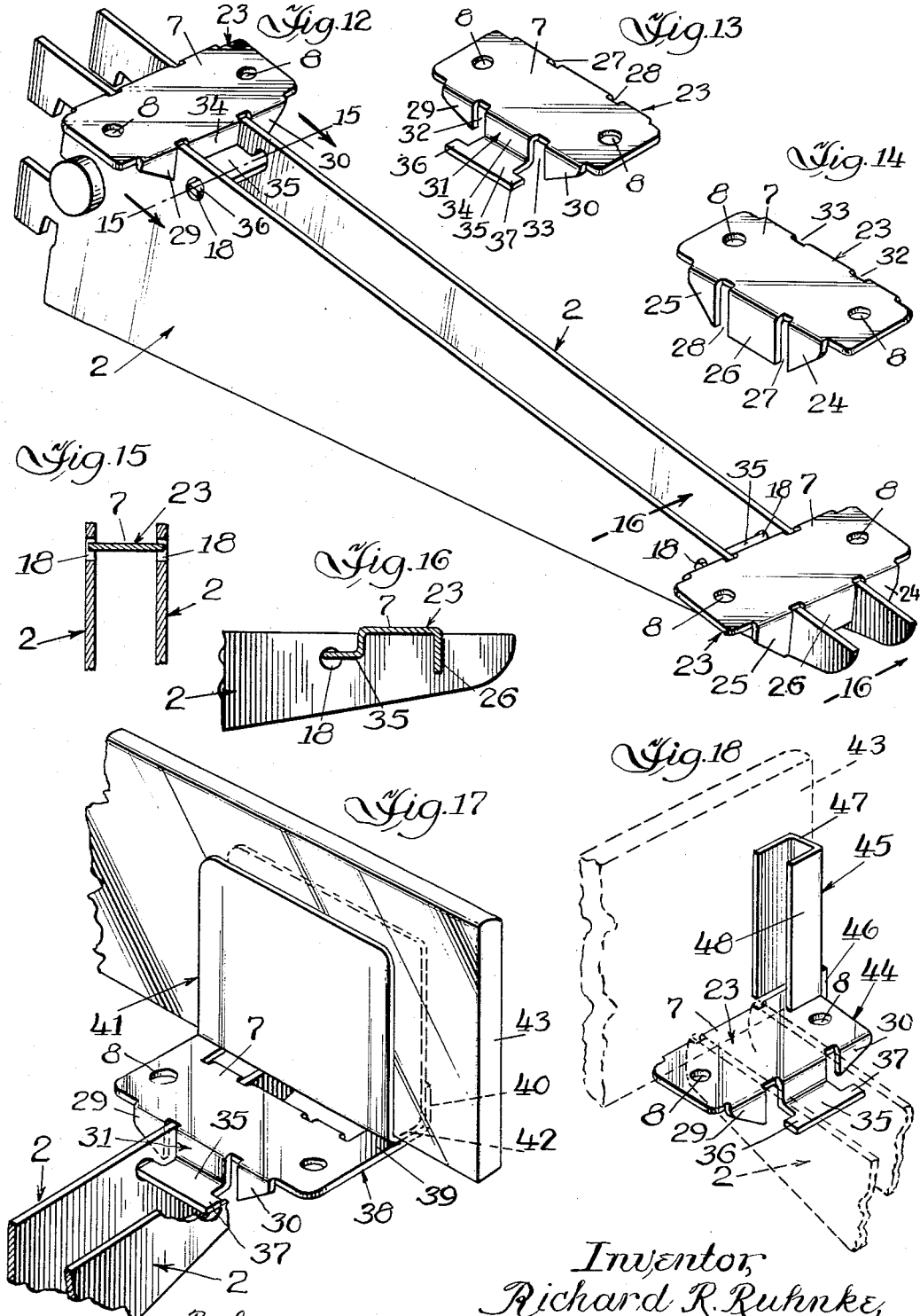

United States Patent Office 3,199,822
Patented Aug. 10, 1965

3,199,822
SUPPORT CLIP
Richard R. Ruhnke, Skokie, Ill., assignor to
Garcy Corporation, a corporation of Illinois
Filed June 21, 1962, Ser. No. 206,122
14 Claims. (Cl. 248—243)

This application is a continuation-in-part of my prior copending application Serial No. 36,861, filed June 17, 1960, now abandoned.

This invention relates to a support clip with particular reference to means for attaching support clips to brackets upon which display shelves are mounted.

The present invention is concerned with a display structure in which two or more brackets support a display shelf of glass, wood, or any other suitable material. In such structures the brackets each have a narrow upper edge disposed in a common horizontal plane and providing a narrow supporting surface for the shelf. In the prior art various means have been used to provide the additional stability afforded by a wider supporting surface for the shelves. For example, clips having slotted ears have been slipped over the upper edges of the brackets. In the prior art, clips have been secured to the brackets by means of a screw or rivet, or the interengagement of the brackets with the slots in the ears has been relied upon to hold the clip in place.

If the clip is riveted in place it usually is riveted in the factory, and, while the structure is generally satisfactory in use, it has a serious disadvanatage in that it cannot be shipped economically because of the extra space taken up by the clips which prevents the brackets from being packed with their wide surfaces juxtaposed. The clips secured by screws have the same disadvantage insofar as packing is concerned if they are secured in the factory. These brackets and clips may be shipped in disassembled condition, but this requires packing at least four separate items, and it is bothersome for the installer to apply a screw and coacting nut to each clip. The clip without any additional securing means is disadvantageous because it will slide aolng the upper edge of the bracket and may easily be knocked out of place.

In accordance with the present invention, a portion of one locking ear is bent at right angles, and the bent portion has either one or two integral lateral projections. Each of the projections is adapted to fit in an aperture in a bracket to detachably lock the support clip in place. Support clips having a locking ear provided with two projections are adapted to detachably secure two brackets together in parallel spaced relationship to form a double bracket unit. Although it is preferred to use support clips having a single laterally extending projection with the single bracket unit, it is possible to use clips having two projections with either a single or double bracket unit.

The support clips and brackets are preferably packaged separately to provide compact packages that will not waste any shipping or storage space. Identical brackets may be used with support clips of either type to provide either a single bracket unit or a double bracket unit. After a bracket unit is separated, the bracket or brackets may be used again in either a single or double bracket unit. The double bracket unit eliminates the need for any of the bulky, expensive double bracket structures that heretofore have been the only double brackets structures available. The support clips may be readily attached to the brackets and secured firmly in place without the use of any tool. The apertures in the brackets locate the support clips which are usually positioned near each end of the bracket. Extra apertures may be provided in the brackets so that the support clips may be shifted from one position to another without difficulty. The support clips are locked to the brackets without any possibility of accidental displacement although they may be separated therefrom easily by proper manipulation.

The structure by means of which the above-mentioned and other advantages of the invention are attained will be described in the following specification, taken in conjunction with the accompanying drawings, showing a preferred illustrative embodiment of the invention, in which:

FIG. 12 is a fragmentary perspective view of a double bracket unit with another embodiment of the support clip;

FIG. 13 is a fragmentary perspective view of the support clip of FIG. 12 looking at one side of the clip;

FIG. 14 is a view similar to FIG. 13 looking at the opposite side of the support clip;

FIG. 15 is a cross sectional view, taken along the line 15—15 of FIG. 12;

FIG. 16 is a cross sectional view, taken along the line 16—16 of FIG. 12;

FIG. 17 is a fragmentary perspective view showing another form of support clip; and FIG. 18 is a fragmentary perspective view showing another form of support clip.

Figure 1:
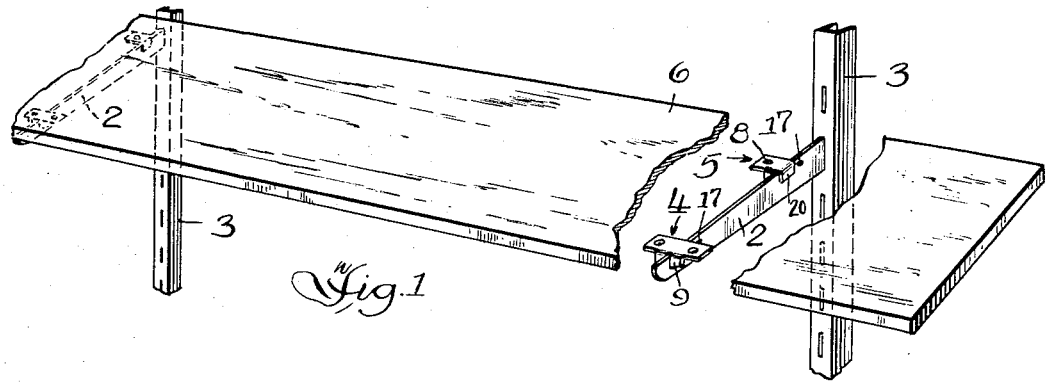
FIGURE 1 is a fragmentary perspective view of a display structure, showing two brackets each provided with clips for suporting a shelf.
Figure 2:
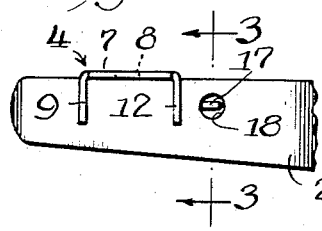
FIG. 2 is a fragmentary side elevational view showing one type of support clip secured to a bracket.
Figure 3:
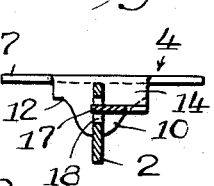
FIG. 3 is a cross sectional view, taken along the line 3—3 of FIG. 2.
Figure 7:
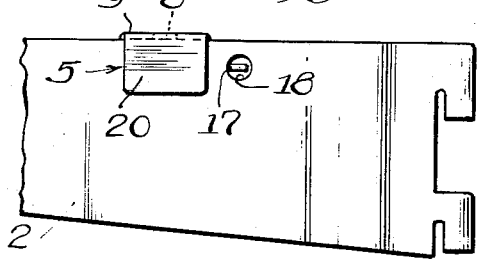
FIG. 7 is a fragmentary side elevational view of a bracket with a different type of support clip secured thereto.
Figure 4:
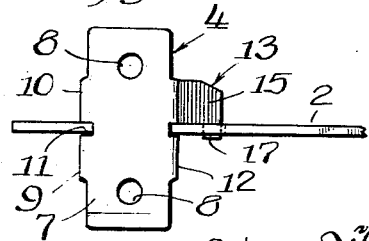
FIG. 4 is a fragmentary top plan view of the bracket with the clip of FIG. 3 secured thereto.
Figure 8:
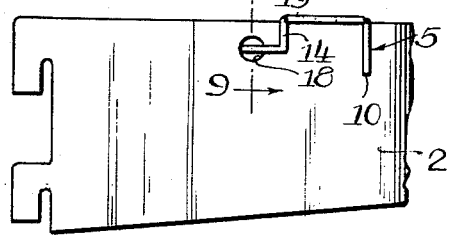
FIG. 8 is a fragmentary side elevational view showing the opposite side of the bracket of FIG. 7.
Figure 9:
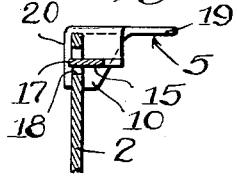
FIG. 9 is a cross sectional view, taken along the line 9—9 of FIG. 8.
Figures 6, 10, 11:
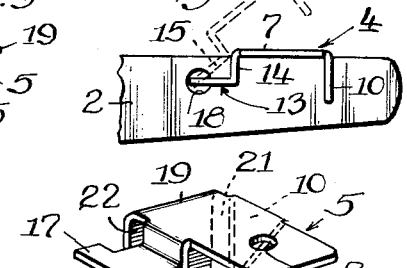
FIG. 6 is a fragmentary side elevational view showing the method of removing or securing the support clip.
FIG. 10 is a fragmentary top plan view of the bracket with the support clip of FIG. 9 secured thereto.
FIG. 11 is a detail perspective view of the support clip shown in FIG. 7–10.
Figure 5:
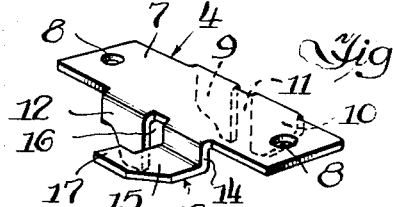
FIG. 5 is a detail perspective view of the support clip shown in FIGS. 2, 3 and 4.

Referring to FIGS. 1 to 11 of the drawings, brackets 2 of metal plate or sheet material projecting forwardly from standards 3 are each provided with support clips 4 or 5 for supporting a display shelf 6 in a horizontal plane. The standards and brackets are conventional structures and therefore will not be described specifically. In FIG. 1 the bracket is shown as having two different types of support clips secured thereto, but it will be understood that in normal use the clips on any one bracket will be of the same type. The only essential difference between support clips 4 and 5 is that the clip 4 provides an extended horizontal supporting surface on both sides of the bracket, while the clip 5 has a supporting surface mainly on only one side of the bracket. Support clip 5 is used when the bracket is up against a wall and there is not room for a supporting surface between the bracket and the wall.

Support clip 4 comprises a flat body portion 7 having an aperture 8 adjacent each end. The apertures may be used for screws (not shown) to hold a wood shelf in place, or for rubber or plastic buttons (not shown) to form a soft supporting surface for a glass shelf. Two ears 9 and 10, bent downwardly from one edge of body portion 7, are spaced from each other by a slot 11 having a width substantially equal to the thickness of bracket 2. A third ear 12, similar to ears 9 and 10, is bent downwardly from the opposite edge of body portion 7. Support clip 4 is provided with a fourth ear 13 that comprises two sections 14 and 15 bent at right angles to each other.

Section 14 is bent downwardly from said opposite edge of body portion 7 in alignment with ear 12 and is spaced therefrom by a slot 16 aligned with slot 11 and having the same width. The slots 11 and 16 are adapted to receive the upper edge of the bracket 2 when the support clip is positioned on the bracket. Section 15 is bent at right angles to section 14 and extends outwardly in a plane parallel to the plane of body portion 7 intermediate the depth of ear 12. At its outermost edge, section 15 has an integral lateral projection 17 extending parallel to the longitudinal axis of the body portion 7 and traversing slot 16. The inner edge of projection 17 is spaced outwardly of ear 12.

Bracket 2 is provided with an aperture 18 adjacent its upper edge for each clip 4. The diameter of each aperture 18 is greater than the width of projection 17. The center of each aperture 18 is spaced from the upper edge of bracket 2 a distance equal to the vertical distance between section 15 and body portion 7 of support clip 4. Body portion 7 rests on the narrow supporting surface provided by the upper edge of the bracket when the support clip is in position for use with projection 17 extending through aperture 18. The distance between the inner edge of projection 17 and the outer surface of ear 12 is greater than the distance between the upper edge of aperture 18 and the upper edge of bracket 2 for a purpose hereinafter disclosed. Although two apertures 18 are shown in bracket 2, additional apertures may be provided for attaching the support clips in different positions or for using more than two support clips, if desired.

The method of attaching support clip 4 to bracket 2 is very simple. The clip is held with body portion 7 perpendicular to the plane of the upper edge of the bracket and projection 17 aligned with aperture 18. The clip is then moved transversely to insert projection 17 in aperture 18 and align slots 11 and 16 with the bracket. The spacing of the inner edge of projection 17 from the outer surface of ear 12 at a greater distance than the spacing of aperture 18 from the upper edge of bracket 2 permits the projection to enter the aperture easily. The clip is then rotated through 90° to engage the slots with the bracket. In this position the ears straddle the bracket and the underside of body portion 7 rests on the narrow supporting surface provided by the upper edge of bracket 2 to hold the clip firmly anchored in place. Ears 9 and 12 abut one side of the bracket, and ears 10 and 13 abut the opposite side of the bracket to prevent any lateral movement of the clip relative to the bracket. The engagement of projection 17 with aperture 18 locks the support clip against accidental displacement relative to the bracket. Although the support clip cannot be displaced accidentally, it may easily be removed by rotating the clip upwardly through 90° about projection 17 as a pivot.

Support clip 5, shown in FIGS. 7–11, is similar to clip 4, and identical parts will be identified by the same reference characters. One end of the body portion 19 of support clip 5 is bent at right angles to form an ear 20 that replaces both ears 9 and 12. Ear 20 is spaced from ears 10 and 13 by slots 21 and 22, respectively. Support clip 5 is secured to the bracket and removed therefrom in the same manner as clip 4. The position of support clip 5 may be reversed relative to the bracket so that the same clip may be used with ear 20 positioned on either side of the bracket. Either type of support clip provides greater stability for a shelf mounted on a pair of laterally spaced brackets and, if desired, a short shelf may be supported on a single bracket if the shelf is secured to the clips by screws or other suitable fastening means.

Referring to FIG. 12 of the drawings, two brackets 2 are held in parallel spaced relationship by support clips 23. Support clip 23 is similar to support clip 4 and has the same body portion 7 provided with apertures 8 adjacent each end. The bracket unit of FIG. 12 is essentially the same as that of FIG. 1 except that the double bracket unit can support a greater load than the single bracket assembly. Three ears 24, 25 and 26, bent downwardly from one edge of body portion 7, are spaced from adjacent ears by slots 27 and 28 each of which has a width substantially equal to the thickness of bracket 2. Ears 29 and 30, similar to ears 24, 25 and 26, but separated a greater distance, are bent downwardly from the opposite edge of body portion 7. A sixth ear, 31, is bent downwardly between ears 29 and 30 and is separated from them by slots 32 and 33, respectively. Slots 32 and 33 each have a width substantially equal to the thickness of bracket 2. Slots 27 and 32 are in alignment with each other and are adapted to receive the upper edge of one bracket 2. Slots 28 and 33 are similarly aligned and are adapted to receive the upper edge of another bracket 2.

Ear 31 comprises two sections 34 and 35 bent at right angles to each other. Section 35 extends outwardly in a plane parallel to the plane of body portion 7 intermediate the depth of ears 29 and 30. Section 34 has a length equal to the normal distance between the upper edge of bracket 2 and the center of aperture 18. As its outermost edge, section 35 has integral oppositely disposed, lateral projections 36 and 37 traversing slots 32 and 33, respectively. The inner edges of projections 36 and 37 are spaced outwardly of ears 29 and 30, respectively. When projections 36 and 37 are positioned in apertures 18, the body portion 7 rests on two supporting surfaces provided by the upper edges of both brackets 2. The distance between the inner surface or projections 36, 37 and the other surface of ears 29, 30, respeceively, is greater than the distance between the upper edge of bracket 2 and the center of aperture 18. Accordingly, when the support clip is swung upwardly through an angle of 90° about projections 36, 37 as a pivot, ears 29 and 30 are positioned outwardly of the upper edges of brackets 2, and the brackets may be moved outwardly to separate them from the support clip.

The assembly of the double bracket unit is very simple. A support clip 23 is positioned with one projection 36 or 37 extending through an aperture 18, and section 34 parallel to the upper edge of the bracket. A second bracket 2 is then positioned with the corresponding aperture 18 fitting over the other projection 37 or 36, and the support clip is then swung pivotally through 90° to engage slots 27 and 28 with the upper edges of brackets 2. The opposite ends of brackets 2 are then spread apart slightly to assemble a second support clip with the brackets.

Referring to FIG. 17, a support clip 38 is similar to support clip 23 except that it has strips 39 projecting longitudinally from opposite sides. The outer end of each strip 39 is bent upwardly to form a flange 40. A channel member 41 has its web 42 welded to strips 39. Channel member 41 is adapted to receive an intermediate portion of a glass or plastic partition 43. Channel member 41 preferably has resilient upstanding walls so as to provide a firm grip on the partition. The partition permits use of partitions or other suitable dividers extending toward the standard to divide the shelf space into bins for display of small items that are generally removed from the bin as they are sold.

In FIG. 18, a support clip 44 has an upright channel member 45 secured thereto. The support clip has an upstanding flange 46 to which the channel member 45 is welded. Channel member 45 is particularly adapted to hold one end of partition 43. If desired, channel member 45 may be modified to receive the ends of two partitions extending at right angles to each other. For example, another upright channel member 45 may have its web 47 welded to one leg 48 of channel member 45 to hold the ends of two partitions and thus form a corner construction for a bin.

If the support clips are to be used to support hang rods from which garment hangers are suspended, the channel members may be made of semi-circular, rectangular, or any desired cross section to conform to the cross sectional configuration of the hang rod to be used therewith.

Although I have described a few preferred embodiments of the invention in considerable detail, it will be understood that the description thereof is intended to be illustrative, rather than restrictive, as many details of structure may be modified or changed, without departing from the spirit or scope of the invention. Accordingly, I do not desire to be restricted to the exact construction described.

I claim:

1. A support clip adapted to be mounted on a bracket, said clip comprising a flat body portion for supporting an article thereon, a plurality of ears depending from said body portion, said ears being spaced to engage opposite sides of a bracket, one of said ears having one section offset from and parallel to said body portion, and an integral projection extending laterally from said one section in a direction parallel to the longitudinal axis of said body portion, said projection being engageable with a bracket on which said clip is mounted to lock said clip against accidental displacement.

2. A support clip adapted to be mounted on a bracket, said clip comprising a flat body portion for supporting an article thereon, a plurality of ears depending from said body portion at right angles to one longitudinal edge of said body portion, said ears being spaced to engage opposite sides of a bracket, the outer end portion of one of said ears being bent at right angles to said ear, and an integral projection extending laterally from the outer end portion of said one ear in a direction parallel to the longitudinal axis of said body portion for engagement with a bracket on which said clip is mounted to prevent accidental displacement of said clip relative to said bracket.

3. A support clip comprising a flat body portion for supporting an article thereon, a pair of ears depending from each longitudinal edge of said body portion, the ears of each pair being spaced from each other to fit on opposite sides of a bracket having an upper edge providing a narrow supporting surface, and means integral with one of said ears extending therefrom in parallel offset relationship to said body portion and in a direction parallel to the longitudinal axis of said body portion for engagement with said bracket with said body portion seated on said supporting surface, for locking said clip against accidental displacement relative thereto.

4. A support clip comprising a flat body portion for supporting an article thereon, a pair of ears depending from each longitudinal edge of said body portion, the ears of each pair being spaced from each other to fit on opposite sides of a bracket having an upper edge providing a narrow supporting surface for said body portion, one of said ears having one section contiguous to one longitudinal edge of said body portion and a second section extending at right angles to said first mentioned section, and an integral projection extending laterally from said second section in a direction parallel to the longitudinal axis of said body portion for engagement with said bracket with said body portion seated on said supporting surface, for locking said clip against accidental displacement relative to said bracket.

5. A support clip comprising a flat body portion for supporting an article thereon, a pair of ears depending from each longitudinal edge of said body portion, the ears of each pair being spaced from each other to fit on opposite sides of a bracket having an upper edge providing a narrow supporting surface for said body portion, one of said ears having an outer portion bent outwardly at right angles parallel to said body portion, and an integral projection extending laterally from the outer portion of said one ear in a direction parallel to the longitudinal axis of said body portion, said projection having an inner edge spaced outwardly from the adjacent longitudinal edge of said body portion and being adapted to engage said bracket with said body portion seated on said supporting surface for locking said clip against accidental displacement relative to said bracket.

6. A support clip comprising a flat body portion for supporting an article thereon, one end of said body portion being bent downwardly in a plane extending transversely of the length of said clip to engage one side of an apertured bracket on which said clip is mounted, an ear depending from each longitudinal edge of said body portion in a plane perpendicular to the plane of said downwardly bent ear for engaging the opposite side of said bracket to cooperate with said downwardly bent end for preventing transverse movement of said clip relative to said bracket, and an integral projection extending laterally from one of said ears to engage an aperture in said bracket for preventing accidental displacement of said clip relative to said bracket.

7. In combination with a bracket having a narrow upper edge and an aperture adjacent said upper edge, a support clip mounted on said bracket, said support clip comprising a flat body portion for supporting an article thereon, said flat body portion being seated on the upper edge of said bracket and extending beyond each side thereof, a plurality of ears depending from said flat body portion and straddling the sides of said bracket for preventing transverse movement of said clip relative to said bracket, the outer end portion of one of said ears being bent at right angles parallel to said body portion, and an integral projection extending laterally from the outer end portion of said last mentioned ear in a direction parallel to the longitudinal axis of said body portion, said projection extending into said aperture for locking said clip against accidental displacement from said bracket.

8. In combination with a bracket having a narrow upper edge and an aperture adjacent said upper edge, a support clip mounted on said bracket, said support clip comprising a flat body portion for supporting an article thereon, said flat body portion being seated on the upper edge of said bracket and extending beyond each side thereof, a plurality of ears depending from said flat body portion and straddling the sides of said bracket for preventing transverse movement of said clip relative to said bracket, and an integral projection extending laterally from one of said ears, the inner edge of said projection being spaced from the adjacent edge of said body portion a distance greater than the distance between the upper edge of said bracket and the adjacent edge of said aperture, said projection extending into said aperture for locking said clip against accidental displacement from said bracket.

9. A support clip comprising a flat body portion for supporting an article thereon, a plurality of ears depending from said body portion, said ears being spaced to fit on opposite sides of a pair of spaced parallel brackets, and means integral with said ears adapted to engage both of said brackets for locking said support clip against accidental displacement relative to either of said brackets.

10. A support clip comprising a flat body portion for supporting an article thereon, a plurality of ears depending from said body portion, said ears being spaced to fit on opposite sides of a pair of spaced parallel brackets, and integral projections extending laterally in opposite directions to engage both of said brackets for locking said support clip against accidental displacement relative to either of said brackets.

11. A support clip comprising a flat body portion for supporting an article thereon, a plurality of ears depending from opposite sides of said flat body portion, said ears being spaced to fit on opposite sides of a pair of spaced parallel brackets, one of said ears having a section offset from and parallel to said body portion, and a pair of integral projections extending laterally in opposite directions from said one section to engage both of said brackets for locking said support clip against accidental displacement relative to either of said brackets.

12. A support clip having a body portion, a channel member for supporting an upright partition, a plurality of ears depending from said body portion, said ears being spaced to fit on opposite sides of a pair of spaced brackets, and projections extending from one of said ears to engage apertures in said brackets for locking the support clip against accidental displacement relative to said brackets.

13. A double bracket unit comprising a pair of individual brackets arranged in parallel planes and a support clip straddling the upper edges of said brackets and engaging both sides of each of said brackets to hold them in spaced parallel relationship.

14. A double bracket unit comprising a pair of individual brackets and a support clip, said brackets each having a narrow upper edge and an aperture adjacent said upper edge, said support clip having a plurality of ears engaging opposite sides of each of said brackets and a pair of integral projections extending into said apertures to hold said brackets in parallel spaced relationship and to hold said support clip against accidental displacement relative to said brackets.

References Cited by the Examiner
UNITED STATES PATENTS

| | | | |
|---|---|---|---|
| 813,501 | 2/06 | Keil | 248—243 |
| 951,134 | 3/10 | Knape | 248—250 |
| 1,797,091 | 3/31 | Kapp et al. | 24—259 X |
| 2,443,517 | 6/48 | Rockwell | 248—243 |
| 2,534,952 | 12/50 | Comer | 248—243 |
| 2,576,865 | 11/51 | Vanderveld | 248—243 |
| 2,887,291 | 5/59 | Holmquist | 248—247 |
| 2,891,680 | 6/59 | MacAleese | 248—250 |

FOREIGN PATENTS

| | | |
|---|---|---|
| 228,826 | 6/60 | Australia. |
| 1,067,741 | 1954 | France. |
| 22,195 | 1914 | Great Britain. |
| 324,990 | 2/30 | Great Britain. |
| 414,757 | 8/34 | Great Britain. |
| 675,532 | 7/52 | Great Britain. |

CLAUDE A. LE ROY, *Primary Examiner.*